US012774023B2

(12) United States Patent
Davis

(10) Patent No.: US 12,774,023 B2
(45) Date of Patent: Oct. 27, 2026

(54) BRAKE SYSTEM WITH A FOOT PEDAL CAVITY

(71) Applicant: LOADHOG LIMITED, Sheffield (GB)

(72) Inventor: Luke Davis, Sheffield (GB)

(73) Assignee: LOADHOG LIMITED (GB)

( * ) Notice: Subject to any disclaimer, the term of this patent is extended or adjusted under 35 U.S.C. 154(b) by 282 days.

(21) Appl. No.: 18/726,980

(22) PCT Filed: Jan. 25, 2023

(86) PCT No.: PCT/IB2023/050620

§ 371 (c)(1),
(2) Date: Jul. 5, 2024

(87) PCT Pub. No.: WO2023/144712

PCT Pub. Date: Aug. 3, 2023

(65) Prior Publication Data

US 2025/0153757 A1 May 15, 2025

(30) Foreign Application Priority Data

Jan. 28, 2022 (GB) .................................... 2201095
Jan. 19, 2023 (GB) .................................... 2300772

(51) Int. Cl.
*B62B 5/04* (2006.01)
*B60T 7/06* (2006.01)
*B60T 11/04* (2006.01)
*B62B 5/00* (2006.01)

(52) U.S. Cl.
CPC .............. *B62B 5/0433* (2013.01); *B60T 7/06* (2013.01); *B60T 11/04* (2013.01); *B62B 5/0485* (2013.01); *B62B 5/0093* (2013.01)

(58) Field of Classification Search
CPC ... B62B 5/0433; B62B 5/0093; B62B 5/0485; B60T 7/06; B60T 11/04
USPC ....................... 188/19–22, 29–31; 280/47.17
See application file for complete search history.

(56) References Cited

U.S. PATENT DOCUMENTS 12,240,516 B2 * 3/2025 Makin .................. B62B 5/0093
2026/0125095 A1 * 5/2026 Davis ........................ B60T 7/04

FOREIGN PATENT DOCUMENTS

CN 212047550 U * 12/2020 ............... B62B 9/08
CN 212654411 U * 3/2021 ............... B62B 9/08
CN 113276924 A * 8/2021 ........... B62B 5/0476
GB 2043549 A 10/1980
GB 2587860 A 4/2021
WO 2020/261130 A1 12/2020

* cited by examiner

*Primary Examiner* — Christopher P Schwartz
(74) *Attorney, Agent, or Firm* — Clark Hill PLC; James R. Foley

(57) ABSTRACT

Embodiments of the invention relate to a brake system (200), to wheeled manual handling equipment (100), and to a foot pedal subassembly (201). The brake system (200) comprises: a foot pedal (108) having a cavity (206); and a brake mechanism (202) connecting the foot pedal (108) to at least one wheel brake (300), wherein the brake mechanism (202) comprises a one-way driver (204) to enable push-to-engage and push-to-release actuation of the at least one wheel brake (300) by the foot pedal (108), and wherein the one-way driver (204) is within the cavity (206) of the foot pedal (108).

20 Claims, 4 Drawing Sheets

BRAKE SYSTEM WITH A FOOT PEDAL CAVITY

RELATED/PRIORITY APPLICATION

This application is a National Phase filing regarding International Application No. PCT/IB2023/050620, filed on Jan. 25, 2023, which relies upon Great Britain Application No. 2201095.3, filed on Jan. 28, 2022 and Great Britain Application No 2300772.7, filed on Jan. 19, 2023, for priority.

FIELD OF THE INVENTION

Embodiments of the present invention relate to a brake system with a foot pedal cavity. In particular, but not exclusively, the brake system is a dolly brake system for manual handling equipment such as a dolly.

BACKGROUND TO THE INVENTION

Manual handling equipment describes a class of material transport equipment onto which goods can be loaded, and which can be moved by hand to transport the goods. An example of material handling equipment is a dolly, comprising a wheeled platform onto which goods can be loaded.

In order to prevent a dolly or the like from rolling away, a brake system is typically included. The brake system may be operated by a foot pedal.

A durable dolly should withstand shock loads, ice buildup and dirty environments. However, brake systems are a typical failure point because they may no longer work reliably if they become contaminated or if they collide with external objects. It is not advisable to design an overly complex brake system, because complexity increases the bill of materials and the number of failure modes.

BRIEF DESCRIPTION OF VARIOUS EMBODIMENTS OF THE INVENTION

According to various, but not necessarily all, embodiments of the invention there is provided a brake system comprising:

a foot pedal having a cavity; and a brake mechanism connecting the foot pedal to at least one wheel brake, wherein the brake mechanism comprises a one-way driver to enable push-to-engage and push-to-release actuation of the at least one wheel brake by the foot pedal, and wherein the one-way driver is within the cavity of the foot pedal.

There are several advantages to providing the one-way driver within the cavity of the foot pedal. A first advantage is that the one-way driver is protected, both from contaminant ingress and from collisions with external objects. A second advantage is manufacturing optimisation, because the foot pedal can be constructed as a replaceable sub-assembly. A third advantage is that the brake system is more compact.

The brake system may be for manual handling equipment. The brake system may be a dolly brake system. The wheel brake may be a friction brake. The friction brake may engage with a contact patch surface of a first dolly wheel. The brake mechanism may further connect the foot pedal to a second wheel brake for a second dolly wheel. The foot pedal may be located along an edge of the dolly, between the first and second dolly wheels.

The dolly brake system has several advantages compared to previous dolly brakes which are built into wheel assemblies. Firstly, multiple wheels can be braked and released via actuation of a single pedal. Secondly, push-push pedal actuation as described earlier means that a lightly-loaded dolly cannot be lifted off the ground by the user's braking foot.

The cavity of the foot pedal may be between upper and lower boundary surface portions of the foot pedal. The cavity of the foot pedal may be between left and right boundary surface portions of the foot pedal. The foot pedal may further comprise an outboard boundary surface portion, outboard of the cavity.

An advantage is that the parts within the cavity of the foot pedal are substantially protected from ingress of dirt and other contaminants.

The cavity of the foot pedal may be open from an inboard side of the cavity. This enables maintenance access.

At least some of the boundary surface portions of the foot pedal may be integrally moulded.

The one-way driver may be implemented as a one-way rotator. The one-way rotator may comprise a ratchet drive. The ratchet drive may comprise a propelling ratchet meshed to a propelled ratchet. The propelling ratchet may be coupled to the foot pedal and the propelled ratchet may be coupled to the wheel brake.

An advantage of a one-way rotator is that the brake mechanism does not need to be reset after use.

When the foot pedal is pushed from a home position, its propelling ratchet rotates the propelled ratchet to rotate the brake mechanism. When the pushed foot pedal is caused to return to its home position, the meshed propelling and propelled ratchets may slip by one or more tooth positions to enable the foot pedal to return to its home position without back-rotating the brake mechanism.

The ratchet mechanism may include a ratchet spring to urge the propelling ratchet and the propelled ratchet into meshing engagement with each other. The ratchet spring may urge the propelled ratchet into engagement with the propelling ratchet. The ratchet spring may be within the cavity of the foot pedal. The ratchet spring may apply an urging force coaxial with an axis of rotation of the braking mechanism and the foot pedal.

A part of the one-way driver may be an integrally moulded portion of the foot pedal. For example, if the one-way driver comprises a one-way rotator, a part of the one-way rotator may be the integrally moulded portion referred to. If the one-way driver comprises a ratchet drive, the propelling ratchet of the ratchet drive may be the integrally moulded portion referred to. The integrally moulded portion may be a portion of the left or right boundary surface portion of the foot pedal.

Each of the left and right boundary surface portions of the foot pedal may further support a pedal bearing about which the foot pedal can rotate. Each pedal bearing may be an integrally moulded portion of the respective left or right boundary surface portion.

If the foot pedal is connected to two wheel brakes for separate wheels, one to each side of the foot pedal, then the cavity of the foot pedal may contain an additional second one-way driver. The second one-way driver may be the same type of driver as the first one-way driver. For example, part of the first one-way driver may be an integrally moulded portion of the left boundary surface portion of the foot pedal, and part of the second one-way driver may be an integrally moulded portion of the right boundary surface portion of the foot pedal.

An advantage of two one-way drivers, such as two ratchet drives, is that force is transferred from the foot pedal to both wheel brakes in a symmetrical and balanced manner, reducing the likelihood of the pedal twisting. In addition, the force is spread over a greater surface area, reducing local stress and therefore increasing robustness.

The brake mechanism may comprise a cam operable on the wheel brake, the wheel brake being movable between a braking position and a non-braking position. The cam may be rotatable in a drive direction to move the wheel brake to the braking position. The cam may be further rotatable in the drive direction to enable the wheel brake to move (e.g., bias back) to the non-braking position.

The foot pedal may be movable in drive and return directions. The drive direction of the foot pedal may be a downwards pushing direction of the foot pedal. Alternatively, the drive direction may be an upwards pushing direction of the foot pedal. The one-way driver may rotate the cam when the foot pedal is moved in the drive direction. The one-way driver may rotate the cam each time the foot pedal is moved in the drive direction. The one-way driver may rotate the cam each time the foot pedal is moved in the drive direction to alternately move the wheel brake between the braking position and the non-braking position.

The brake mechanism may include a cam follower to transmit a force applied by the cam to the wheel brake to move the wheel brake to the braking position.

The cam may be coupled to the one-way driver by a shaft of the brake mechanism.

The shaft may extend through the cavity of the foot pedal. The shaft may extend through the left boundary surface portion of the foot pedal and/or through the right boundary surface portion of the foot pedal. The same shaft may interconnect the wheel brakes of first and second wheels, if the foot pedal can brake multiple wheels simultaneously. The shaft may be a single shaft extending continuously from the actuator (e.g., cam) of one of the wheel brakes to that of the other of the wheel brakes.

The advantages of a continuous shaft through the whole subassembly are improved structural integrity, convenient assembly, and ensuring the wheel brakes stay synchronised.

The shaft may be supported by the or each pedal bearing about which the foot pedal can rotate. The or each distal end of the shaft, distal from the foot pedal, may be supported by a cam bearing about which the cam can rotate.

The shaft may extend through the or each one-way driver. The shaft may be rotatable by the one-way driver when the one-way driver is rotated by movement of the foot pedal in the drive direction.

If the one-way driver comprises a ratchet drive, the shaft may extend through the ratchet drive. The shaft may be rotatable in the drive direction by rotation of the propelled ratchet. The propelled ratchet may be fixedly connected to the cam via the shaft so that rotation of the ratchet drive rotates the cam to move the wheel brake between the braking position and the non-braking position.

The propelled ratchet may be slidable along the shaft away from the propelling ratchet, to enable the ratchet drive to slip by one or more tooth positions. The propelled ratchet may be slidable away from the propelling ratchet against a bias force. It is advantageous that the ratchet drives are protected from dirt ingress by locating them inside the cavity of the foot pedal, because dirt ingress could interfere with the sliding operation of the propelled ratchet.

The ratchet spring may be coiled around the shaft. The ratchet spring may be connected directly or indirectly to the shaft, and to the propelled ratchet. A ratchet carrier may be provided on the shaft to provide a reaction force to the ratchet spring so that the propelled ratchet is biased towards the propelling ratchet. The ratchet carrier may be fixedly mounted on the shaft. The ratchet carrier may be located inside the cavity of the foot pedal.

The ratchet carrier may further comprise a propelled ratchet guide socket into which a portion of the propelled ratchet is slidable, when the propelled ratchet slides away from the propelling ratchet. This secures and limits the motion of the propelled ratchet.

If two ratchet drives are provided, the ratchet carrier may be centrally located between the two ratchet drives. The ratchet carrier may be double-sided, to connect to a corresponding second ratchet spring and second propelled ratchet of the second ratchet drive.

The brake system may further comprise a pedal return spring to urge the foot pedal towards its home position. The pedal return spring may be within the cavity of the foot pedal. The pedal return spring may be wound around the ratchet carrier, between a pair of flanges on the ratchet carrier. The pedal return spring may be sized to overcome force from the ratchet spring, so that the ratchet spring can resiliently deform to enable the propelled ratchet to slip relative to the propelling ratchet by one or more tooth positions.

According to various, but not necessarily all, embodiments of the invention there is provided wheeled manual handling equipment comprising a body, a plurality of wheels, and a brake system as described above operable on the wheels. The wheeled manual handling equipment may comprise a wheeled platform. The wheeled manual handling equipment may comprise a dolly.

According to various, but not necessarily all, embodiments of the invention there is provided a foot pedal subassembly for a brake system, the foot pedal subassembly comprising:

- a foot pedal having a cavity; and
- a one-way driver of a brake mechanism for connecting the foot pedal to at least one wheel brake, wherein the one-way driver is to enable push-to-engage and push-to-release actuation of the at least one wheel brake by the foot pedal, and wherein the one-way driver is within the cavity of the foot pedal. The foot pedal subassembly may further comprise, within the cavity, at least one of the earlier-described features: the ratchet spring; the second one-way driver; the ratchet carrier; the pedal return spring; or a portion of the shaft.

According to various, but not necessarily all, embodiments of the invention there is provided a brake system comprising:

- a cam operable on a wheel brake for a wheel, the wheel brake being movable between a braking position and a non-braking position, wherein the cam is rotatable to move the wheel brake to the braking position;
- a foot pedal movable in drive and return directions, the foot pedal comprising a cavity; and
- a ratchet to rotate the cam when the foot pedal is moved in the drive direction, the ratchet being connected to the foot pedal and to the cam, wherein the ratchet is within the cavity of the foot pedal.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
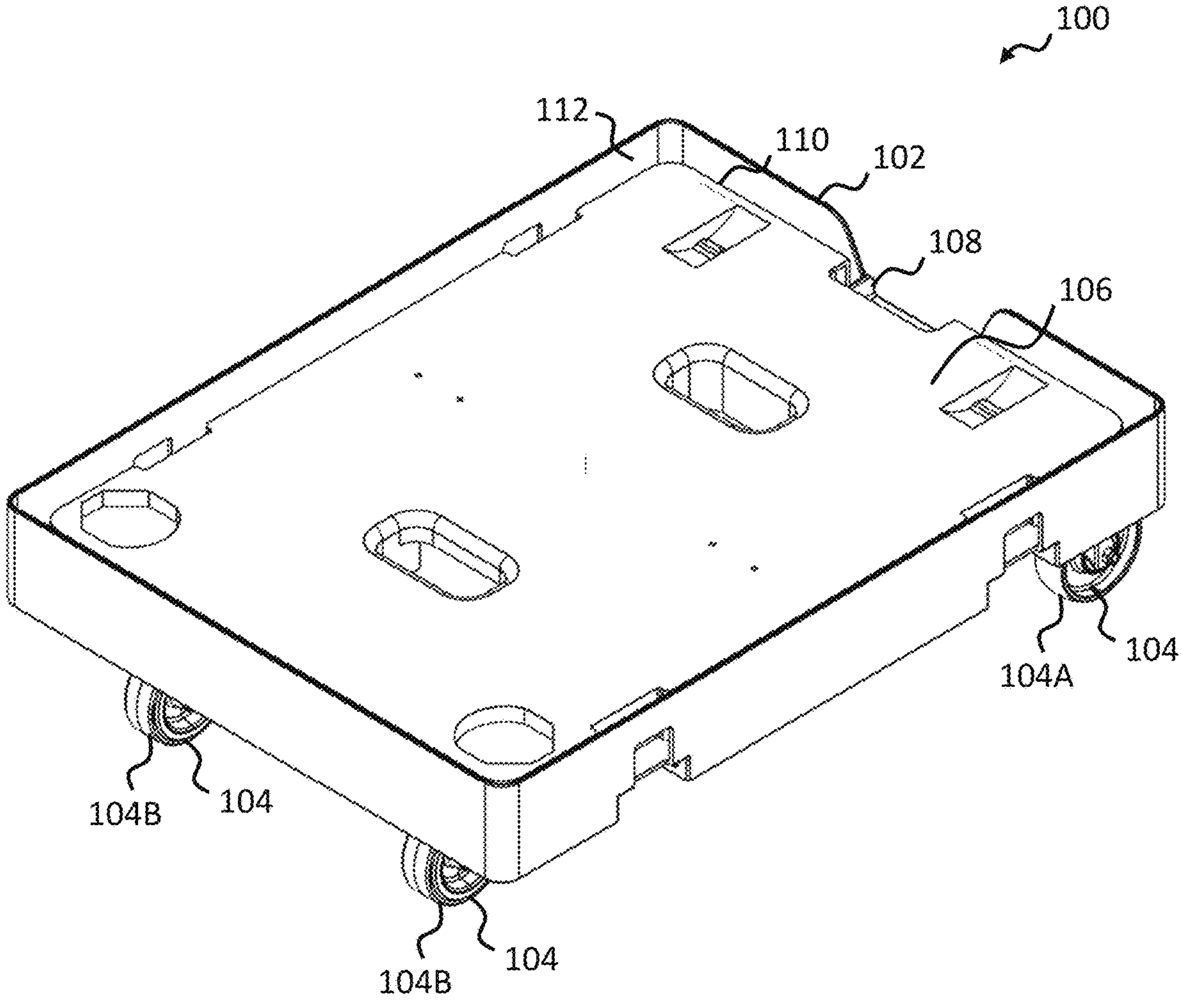
FIG. 1 illustrates an example of wheeled manual handling equipment.

FIG. 1 illustrates a general arrangement of wheeled manual handling equipment 100. The illustrated wheeled manual handling equipment 100 is a dolly. However, in other implementations, the wheeled manual handling equipment 100 could be a different type of manual handling equipment.

The dolly 100 comprises a body 102 and a plurality of wheels 104 beneath the body 102. The body 102 in FIG. 1 is a wheeled platform 106 for supporting a load. The platform 106 may be substantially flat and may comprise upstanding flanges 112 at its edges to prevent load spillage. The height of the platform 106 above ground level (bottom of wheels 104) may be less than 30 centimetres.

The wheels 104 may be casters. A wheel may be provided under each corner of the wheeled platform 106. The wheels 104 are arranged in two pairs: a first pair of wheels 104A at one end of the body 102, and a second pair of wheels 104B at the opposite end of the body 102.

The first pair of wheels 104A are connected to a brake system 200 as illustrated in the later FIGs. The second pair of wheels 104B are not connected to a brake system 200. In another implementation, only a single wheel is connected to a brake system 200, or both pairs of wheels 104A, 104B are connected to a or a respective brake system 200.

In some, but not necessarily all examples, the first pair of wheels 104A may be non-steerable wheels. The second pair of wheels 104B may be steerable wheels.

Figure 2A:
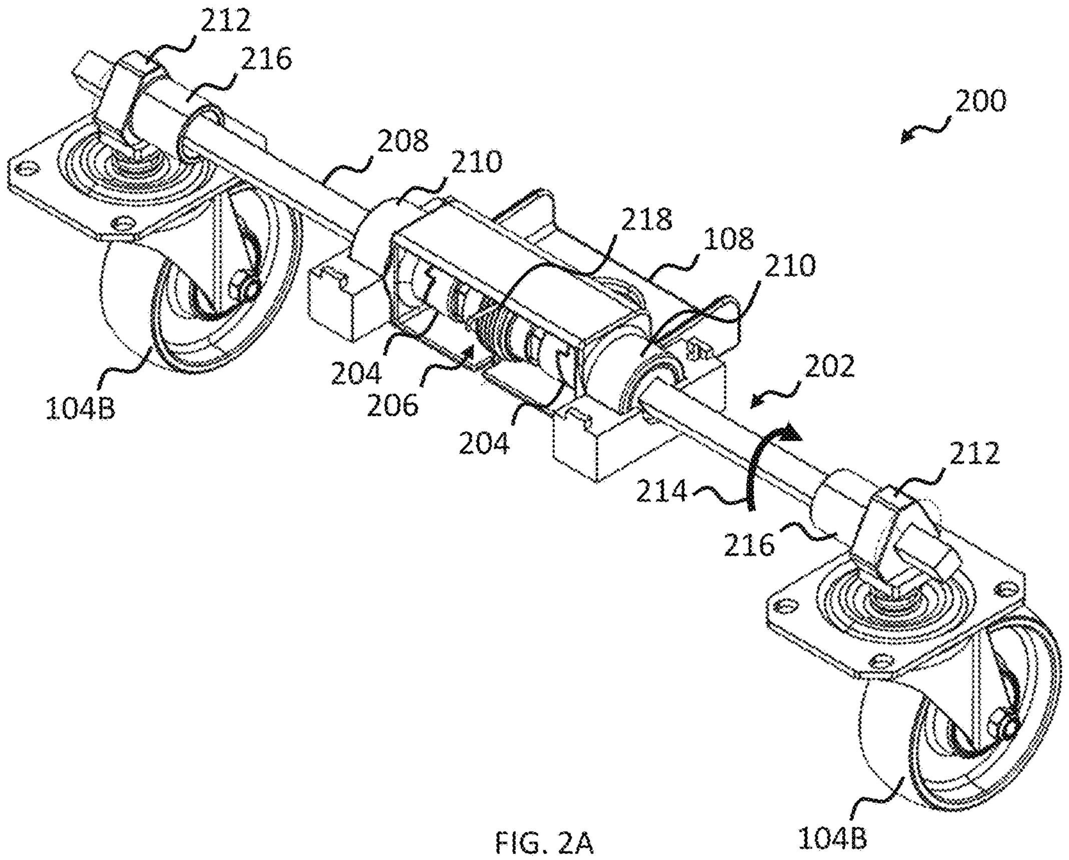
FIG. 2A illustrates an example brake system in a non-braking condition.
Figure 2B:
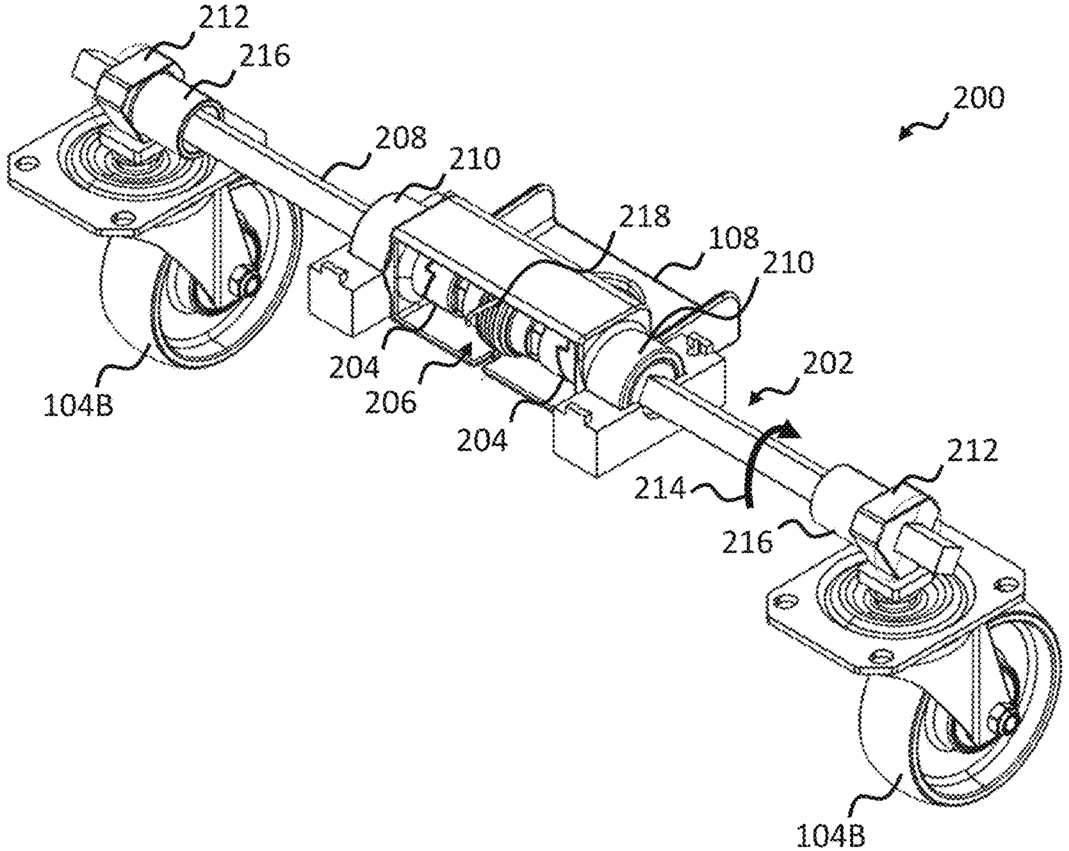
FIG. 2B illustrates the brake system in a braking condition.

FIG. 1 illustrates a foot pedal 108 for the brake system 200 of FIGS. 2A-2B. The foot pedal 108 is located along an edge 110 of the dolly 100, between the wheels of the first pair of wheels 104A. The foot pedal 108 is located at a gap in the upstanding flange 112 of the edge 110.

The illustrated foot pedal 108 can be pushed in a downwards, drive direction from its illustrated home position to change the state of the brake system 200. The brake system 200 enables push-to-engage and push-to-release actuation by the foot pedal 108. The foot pedal 108 may automatically move in a return direction to its home position when the foot pedal 108 is no longer depressed.

FIGS. 2A and 2B illustrate an example brake system 200 in a non-braking condition and a braking condition, respectively. The brake system 200 is operable on the first pair of wheels 104A.

Figure 3:
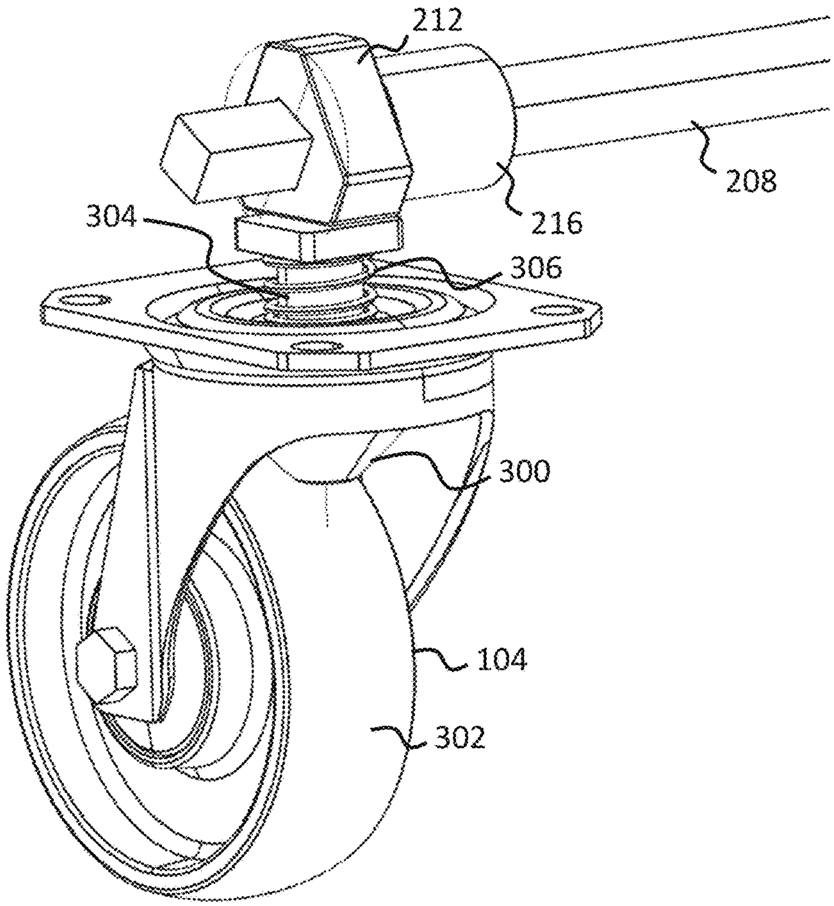
FIG. 3 illustrates a detail view of a wheel brake.

The brake system 200 includes the foot pedal 108, and a brake mechanism 202 connecting the foot pedal 108 to wheel brakes 300 (FIG. 3) so that both wheels 104A can be braked simultaneously by a single depression of the foot pedal 108. In FIGS. 2A-2B, each wheel brake 300 is concealed by wheel caster castings in FIGS. 2A-2B, but an example can be seen in the detail view of FIG. 3. FIG. 3 illustrates a wheel brake 300 comprising a friction brake which can be moved by the brake system 200 to frictionally engage with the outer surface (contact patch surface 302) of the wheel 104.

Returning to FIGS. 2A-2B, the foot pedal 108 is again shown in its default, home position. The foot pedal 108 is optionally rotatable about an axis of rotation, when depressed. The foot pedal 108 is therefore supported on pedal bearings 210, coaxial with said axis, about which the foot pedal 108 can rotate. A pedal bearing 210 is located to each of the left and right side of the foot pedal 108. The pedal bearings 210 may be sufficiently strong and proximal to the sides of the pedal to react against the weight of a human.

In order to enable push-to-engage and push-to-release operation, FIGS. 2A-2B illustrate a pair of one-way drivers 204. Their operation is described in detail later with reference to FIGS. 4-7B. The one-way drivers 204 are housed within a cavity 206 of the foot pedal 108, one to the left side of the cavity 206 and one to the right side of the cavity 206. The cavity 206 is described in detail later, with reference to FIG. 4.

The input of the brake mechanism 202 comprises the foot pedal 108, and the output of the brake mechanism 202 comprises a cam arrangement for each wheel brake 300. The cam arrangement includes a cam 212 and a cam follower 304.

The cam 212 may either be single-lobed or multi-lobed, depending on the implementation. The illustrated cam 212 is multi-lobed. The detail view of FIG. 3 illustrates the cam 212 as comprising three lobes, each operable on the wheel brake 300 to move the wheel brake 300 to a braking position. The lobes are interconnected by base surfaces.

The illustrated cam 212 is a faceted cam to define stable positions of the wheel brake 300. However, a curved cam could be used instead. The illustrated cam 212 is a truncated polygonal cam, with truncated corners of the cam defining lobes. As shown, the cam 212 may optionally be a truncated triangular shape.

The cam follower 304 of FIG. 3 comprises an elongate stem having a cam-engaging head at one end, and the wheel brake 300 connected at its other end. A brake return spring 306 is located between the cam-engaging head and a substrate (e.g., wheel caster casting plate), to bias the cam-engaging head against the cam 212.

In a braking condition of the brake system 200, the wheel brakes 300 are in a braking position frictionally engaged with the wheel. In a non-braking condition of the brake system 200, the wheel brakes 300 are in a non-braking position as shown in FIG. 3, at which the wheel brake 300 is not engaged with the wheel.

As shown in FIGS. 2A-2B, the cams 212 are rotatable in a drive direction 214 of rotation to move the wheel brakes 300 to the braking position. The drive direction 214 of rotation may be the same direction of rotation as the foot pedal 108.

Since the foot pedal 108 is push-to-engage and push-to-release, the drive direction 214 may be the only direction in which the cams 212 can rotate. The one-way drivers 204 may prevent rotation of the cams 212 in the opposite direction than the drive direction 214.

A first rotation of the cam 212 in the drive direction 214 engages its lobe with the cam follower 304 to move the wheel brake 300 to the braking position. A second, consecutive rotation of the cam 212 in the drive direction 214 engages its base surface with the cam follower 304 to enable the brake return spring 306 (FIG. 3) to return the wheel brake 300 to the non-braking position. Further rotation of the cam 212 in the drive direction 214 will engage further lobe(s) (if any) and base surface(s) (if any) in alternating fashion, until the cam 212 has completed a full rotation.

Each above-described rotation of the cams 212 is driven by a single depression of the foot pedal 108 in the drive direction 214. The one-way drivers 204 rotate the cams 212 each time the foot pedal 108 is moved in the drive direction 214. When the foot is released from the foot pedal 108, a pedal return spring 218 biases the foot pedal 108 back up to its home position. The one-way drivers 204 decouple the homing motion of the foot pedal 108 from motion of the cams 212, to prevent back-rotation of the cams 212. Therefore, the foot pedal 108 does not need to be continually depressed in order to maintain the current condition of the brake system 200. The foot pedal 108 automatically returns to its home position, from which it can be pushed to engage to wheel brakes 300 and from which it can be pushed again to release the wheel brakes 300.

The desired number of lobes on the cam 212 depends on the motion ratio of the brake system 200, which depends on the rotational stroke length of the foot pedal 108 and any gear reduction between the foot pedal 108 and the cam 212.

Looking now at how the input (foot pedal 108) and output (cams 212) are mechanically coupled, FIGS. 2A-2B illustrate a shaft 208 interconnecting the cams 212 and extending through the foot pedal 108. In other implementations, no shaft may be provided, for example, the cams 212 may be connected directly to a foot pedal 108. In further implementations, a separate shaft may be provided for each side of the foot pedal 108.

The illustrated shaft 208 has a rotationally asymmetric shape (e.g., quadrilateral cross-section) along at least a portion of its length, to provide a rotational coupling to the cams 212 and to the foot pedal 108. In other examples, different coupling means could be provided, and circular shaft could be used.

The shaft 208 is supported by a plurality of bearings. The shaft 208 is supported in its central region by the pedal bearings 210. The ends of the shaft 208 are supported by cam bearings 216 about which the cams 212 can rotate. The illustrated cam bearings 216 are cylindrical sleeves connected to the cams 212, which fit in corresponding sockets of the dolly 100. Therefore, the cams 212 support the ends of the shaft 208 when the shaft 208 is connected to the cams 212.

The shaft 208 extends through the one-way drivers 204. The shaft 208 is rotatable by the one-way drivers 204 when the one-way drivers 204 are rotated in the drive direction 214 by movement of the foot pedal 108 in the drive direction 214. The one-way drivers 204 cannot rotate the shaft 208 in a direction opposite the drive direction 214.

Figure 4:
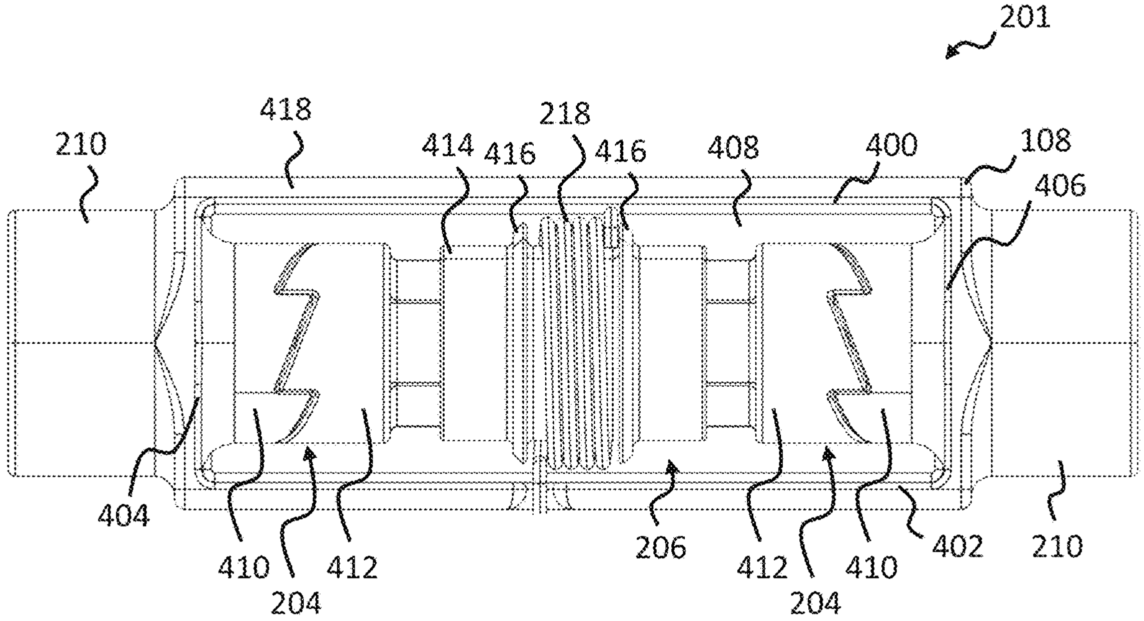
FIG. 4 illustrates an example foot pedal subassembly.
Figure 5:
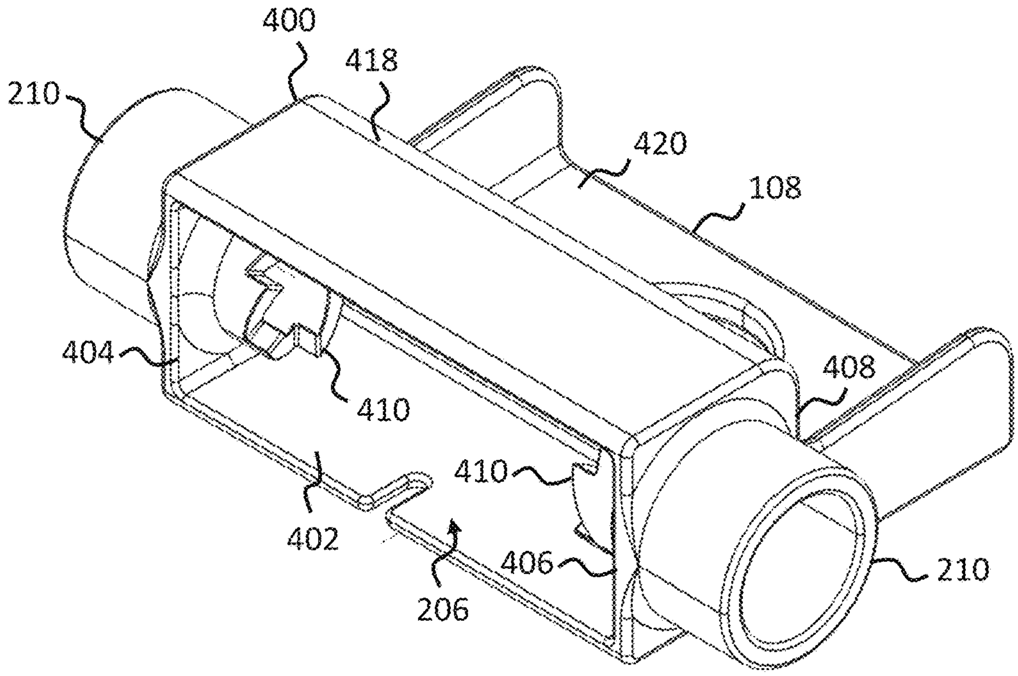
FIG. 5 illustrates an example foot pedal.

FIG. 4 illustrates the cavity 206 in the foot pedal 108, containing the one-way drivers 204 and the shaft 208. They may be provided as a subassembly 201, during manufacture.

The foot pedal 108 comprises a hollow body 418 containing the cavity 206 therein. The interior surfaces of the cavity 206 comprise an upper boundary surface portion 400, a lower boundary surface portion 402, a left boundary surface portion 404, a right boundary surface portion 406, and a rear (outboard) boundary surface portion 408. The front (inboard) side of the cavity 206 may be open to enable installation and maintenance.

The foot pedal 108 may be composed of one or more moulded parts, which has/have been moulded into a shape comprising the cavity 206. The one-way drivers 204 and the shaft 208 are encapsulated within the cavity 206.

The foot pedal 108 of FIG. 4 further comprises an optional foot platform 420 extending from the outboard side of the hollow body 418, to the rear (outboard) boundary surface portion 408 in an outboard direction. The foot platform 420 acts as a lever and is sized to enable at least a portion of a foot to be placed thereon. The foot platform 420 may be integrally moulded with the hollow body 418 of the foot pedal 108.

As shown in FIG. 4, the pedal bearings 210 can be connected to the foot pedal 108. A first pedal bearing 210 is connected to the left side of the foot pedal 108 and the second pedal bearing 210 is connected to the right side of the foot pedal 108. As shown, the first pedal bearing 210 may be connected to the exterior side of the left boundary surface portion 404, and the second pedal bearing 210 may be connected to the exterior side of the right boundary surface portion 406.

The pedal bearings 210 may be integrally moulded portions of the foot pedal 108. The pedal bearings 210 may be integrally moulded portions of the hollow body 418.

The shaft 208 (not shown in FIG. 4) extends from left to right. The shaft 208 extends through the left boundary surface portion 404 of the foot pedal 108 and through the right boundary surface portion 406 of the foot pedal 108. The shaft 208 extends through openings in the pedal bearings 210. The shaft 208 may be coaxial with the pedal bearings 210.

As shown in FIG. 4, each one-way driver 204 comprises a one-way rotator in the form of a ratchet drive. Each ratchet drive 204 comprises a propelling ratchet 410 meshed to a propelled ratchet 412.

Depression of the foot pedal 108 rotates each propelling ratchet 410 in the drive direction 214, causing each propelling ratchet 410 to rotate its corresponding propelled ratchet 412 in the drive direction 214, causing the propelled ratchets 412 to rotate the shaft 208 in the drive direction 214, causing the shaft 208 to rotate the cams 212 in the drive direction 214, causing the cams 212 to change the state of the wheel brakes 300.

In other embodiments, a different type of one-way driver could be implemented such as a clutch.

Each ratchet drive 204 is located within the cavity 206 of the foot pedal 108, as shown in the FIGs.

Two ratchet drives 204 are shown, at symmetrically opposite sides of a centre of the foot pedal 108. This ensures that force from the foot pedal 108 is applied symmetrically to the shaft 208. However, alternative implementations could rely upon a single ratchet drive or could rely upon more than two ratchet drives.

The propelling ratchet 410 of each ratchet drive 204 is coupled to the foot pedal 108. Therefore, when the foot pedal 108 rotates, the propelling ratchets 410 rotate. FIG. 4 shows that the propelling ratchet 410 of the first ratchet drive 204 can be coupled to the left boundary surface portion of the foot pedal 108, and the propelling ratchet 410 of the second ratchet drive 204 can be coupled to the right boundary surface portion of the foot pedal 108. Each propelling ratchet 410 can be an integrally moulded portion of the foot pedal 108.

Each propelling ratchet 410 can comprise a central opening through which the shaft 208 can extend. The propelling ratchet 410 is not directly connected to the shaft 208, but is indirectly connected or connectable to the shaft 208 via the propelled ratchet 412.

By contrast, the propelled ratchet 412 of each ratchet drive 204 is rotatably coupled to the shaft 208. Therefore, when the propelled ratchet 412 is turned by its corresponding propelling ratchet 410 in the drive direction 214, the propelled ratchet 412 turns the shaft 208 in the drive direction 214.

The ratchet drives 204 are oriented so that no slippage occurs during turning in the drive direction 214. That is, the meshing force is applied through the steeply sloped ratchet edges of the ratchets, rather than the shallowly sloped ratchet edges of the ratchets.

The meshing plane of each ratchet drive 204, defined as the plane on which the propelling ratchet 410 meshes with the propelled ratchet 412, is perpendicular to the axis of rotation. The two ratchet drives 204 face in symmetrically opposite directions than each other.

When the pushed foot pedal 108 is raised back to its home position by its pedal return spring 218, the meshed propelling and propelled ratchets 412 can slip by one or more tooth positions to enable the foot pedal 108 to return to its home position without back-rotating the shaft 208. That is, the propelling ratchets 410 rotate in the reverse direction, so that the meshing force is now applied through the shallowly sloped ratchet edges of the ratchets, rather than the steeply sloped ratchet edges. A component of the meshing force pushes the propelled ratchets 412 away from the propelling ratchets 410, which is possible because the propelled ratchets 412 can slide away from the propelling ratchets 410, along the shaft 208. Therefore, the reverse rotation of the propelling ratchets 410 cause the propelled ratchets 412 to slide away from the propelling ratchets 410 and slip by one or more tooth positions, so that the propelled ratchets 412 do not rotate and therefore the shaft 208 and cams 212 do not rotate.

Figure 7A:
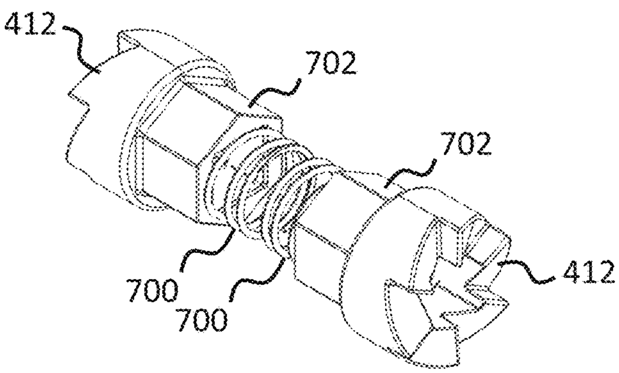
FIG. 7A illustrates the pair of one-way drivers, with the ratchet carrier omitted to reveal internal ratchet springs.

The sliding of each propelled ratchet 412 away from the propelling ratchets 410 is resisted by a bias force applied from a ratchet spring 700 as shown in FIG. 7A. The ratchet springs 700 therefore maintain meshing engagement of the propelled ratchets 412 with the propelling ratchets 410, but are not so strong as to prevent slippage by the required number of tooth positions.

The ratchet springs 700 are coiled around the shaft 208, although the shaft 208 is omitted from view in FIG. 7A. The ratchet springs 700 therefore apply their urging forces coaxial with the axis of rotation, to slide the propelled ratchets 412 along the shaft 208.

Figure 6:
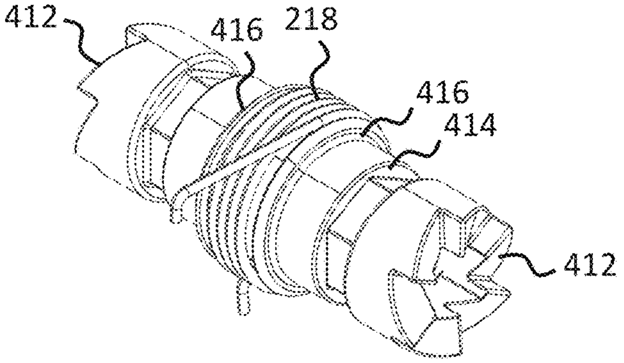
FIG. 6 illustrates a ratchet carrier to which a pair of one-way drivers are connected.
Figure 7B:
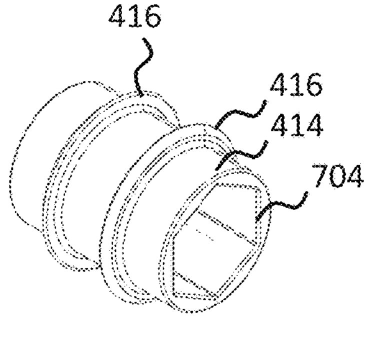
FIG. 7B illustrates the ratchet carrier with the one-way drivers omitted to reveal ratchet guide sockets.

The ratchet springs 700 are located within the cavity 206 of the foot pedal 108. FIGS. 6 and 7B illustrate a carrier 414, which is a part inside the cavity 206 of the foot pedal 108 to which various components associated with the one-way drivers 204 are secured. In the illustrated implementation, the carrier 414 is a ratchet carrier. The ratchet carrier 414 is mounted to the shaft 208 and can rotate with the shaft 208 and is not slidable along the shaft 208.

The ratchet carrier 414 comprises seats for the ratchet springs 700. The ratchet carrier 414 comprises a through-hole (socket 704), inside which is provided a ledge (not visible) to act as a spring seat for the ratchet springs 700. The spring seat provides a reaction force to each ratchet spring 700 so that the propelled ratchets 412 are biased towards the propelling ratchets 410.

Each ratchet spring 700 may be connected indirectly to the shaft 208 via a ratchet carrier 414. The ratchet carrier 414 may be provided on the shaft 208 to provide a reaction force to each ratchet spring 700 so that the corresponding propelled ratchet 412 is biased towards its propelling ratchet 410. The ratchet carrier 414 may be fixedly mounted on the shaft 208. The ratchet carrier 414 may be located inside the cavity 206 of the foot pedal 108.

The illustrated ratchet carrier 414 is double-sided because there are two ratchet drives 204 and because the ratchet carrier 414 is centrally located between the two ratchet drives 204. The ratchet carrier 414 could be single-sided if there is only one ratchet drive.

The through-hole of the ratchet carrier 414 may be sized to define a pair of propelled ratchet guide sockets 704 into which a rear portion of each propelled ratchet 412 is slidable. This ensures that the propelled ratchets 412 are constrained to move in only a sliding direction. The illustrated propelled ratchets 412 each comprise a rear plug 702 (the hexagonal protrusions in FIGS. 6, 7A) sized to fit within a ratchet guide socket 704 of the ratchet carrier 414.

If the one-way driver 204 is a different type of driver than a ratchet drive, then the carrier 414 may be a different type of carrier.

A further function of the illustrated ratchet carrier 414 is to provide a channel (defined between flanges 416) for the pedal return spring 218 for automatically returning the foot pedal 108 to its home position. This enables the pedal return spring 218 to be located within the cavity 206 of the foot pedal 108. The pedal return spring 218 is wound around the exterior surface of the ratchet carrier 414, and is retained by the flanges 416 of the ratchet carrier 414. One end of the pedal return spring 218 is connected to a fixed location on the body 102 of the dolly 100, and the other end of the pedal return spring 218 is connected to the foot pedal 108, so that the foot pedal 108 is urged towards its home position.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A brake system comprising:

a foot pedal having a cavity; and a brake mechanism connecting the foot pedal to a wheel brake, wherein the brake mechanism comprises a one-way driver to enable push-to-engage and push-to-release actuation of the wheel brake by the foot pedal, and wherein the one-way driver is within the cavity of the foot pedal.

2. The brake system of claim 1, wherein the one-way driver is a one-way rotator, wherein the one-way rotator comprises a ratchet drive, and wherein the ratchet drive comprises a propelling ratchet meshed to a propelled ratchet.

3. The brake system of claim 2, wherein when the foot pedal is pushed from a home position, the propelling ratchet rotates the propelled ratchet to rotate the brake mechanism.

4. The brake system of claim 3, wherein when the pushed foot pedal is caused to return to the home position, the meshed propelling and propelled ratchets slip by one or more tooth positions to enable the foot pedal to return to the home position without back-rotating the brake mechanism.

5. The brake system of claim 2, wherein the ratchet mechanism includes a ratchet spring to urge the propelling ratchet and the propelled ratchet into meshing engagement with each other, and wherein the ratchet spring is within the cavity of the foot pedal.

6. The brake system of claim 1, wherein the brake mechanism comprises a cam operable on the wheel brake, the wheel brake being movable between a braking position and a non-braking position.

7. The brake system of claim 6, wherein the cam is rotatable in a drive direction to move the wheel brake to the braking position, and wherein the cam is further rotatable in the drive direction to enable the wheel brake to move to the non-braking position.

8. The brake system of claim 6, wherein the foot pedal is movable in drive and return directions, wherein the one-way driver rotates the cam when the foot pedal is moved in the drive direction, and wherein the one-way driver rotates the cam each time the foot pedal is moved in the drive direction to alternately move the wheel brake between the braking position and the non-braking position.

9. The brake system of claim 6, wherein the brake mechanism includes a cam follower to transmit a force applied by the cam to the wheel brake to move the wheel brake to the braking position.

10. The brake system of claim 1, wherein the wheel brake is a friction brake, wherein the friction brake is configured to engage with a contact patch surface of a first dolly wheel.

11. The brake system of claim 10, wherein the brake mechanism further connects the foot pedal to a second wheel brake for a second dolly wheel.

12. The brake system of claim 1, wherein the cavity of the foot pedal is between upper, lower, left, and right boundary surface portions of the foot pedal.

13. The brake system of claim 12, wherein each of the left and right boundary surface portions of the foot pedal further support a pedal bearing about which the foot pedal is able to rotate.

14. Wheeled manual handling equipment comprising a body, a plurality of wheels, and a brake system as claimed in claim 1 which is operable on the wheels.

15. The wheeled manual handling equipment of claim 14, comprising a dolly.

16. The brake system of claim 1, wherein the cavity of the foot pedal is open from an inboard side of the cavity.

17. The brake system of claim 1, wherein a part of the one-way driver is an integrally moulded portion of the foot pedal.

18. The brake system of claim 1, comprising a pedal return spring to urge the foot pedal towards a home position, wherein the pedal return spring is within the cavity of the foot pedal.

19. A foot pedal subassembly for a brake system, the foot pedal subassembly comprising:

a foot pedal having a cavity; and a one-way driver of a brake mechanism configured to connect the foot pedal to a wheel brake, wherein the one-way driver is to enable push-to-engage and push-to-release actuation of the at least one wheel brake by the foot pedal, and wherein the one-way driver is within the cavity of the foot pedal.

20. The foot pedal subassembly of claim 19, wherein a part of the one-way driver is an integrally moulded portion of the foot pedal.

* * * * *